US00RE34924E

United States Patent [19]

Highsmith

[11] E Patent Number: Re. 34,924

[45] Reissued Date of Patent: May 2, 1995

[54] ROLLER TRACK FOR STORAGE RACK, ROLLER CONVEYOR, OR SIMILAR APPARATUS

[75] Inventor: Charles E. Highsmith, Springfield, Tenn.

[73] Assignee: UNR Industries, Inc., Chicago, Ill.

[21] Appl. No.: 156,357

[22] Filed: Nov. 23, 1993

Related U.S. Patent Documents

Reissue of:

[64] Patent No.: 5,056,642
Issued: Oct. 15, 1991
Appl. No.: 582,255
Filed: Sep. 13, 1990

[51] Int. Cl.[6] ..... B65G 13/00
[52] U.S. Cl. ..... 193/35 R; 193/37
[58] Field of Search ..... 193/35 R, 37, 35 TE, 193/35 F

[56] References Cited

U.S. PATENT DOCUMENTS

| | | | |
|---|---|---|---|
| 2,964,155 | 12/1960 | Flowers et al. | 193/35 |
| 2,983,352 | 5/1961 | DeFlora et al. | 193/35 |
| 3,197,647 | 7/1965 | Fraenkel . | |
| 3,209,879 | 10/1965 | Wahl | 193/35 |
| 3,252,556 | 1/1966 | Itacsson | 193/37 |
| 3,305,089 | 2/1967 | Fraenkel . | |
| 3,420,348 | 1/1969 | Caudell et al. | 193/35 |
| 3,586,142 | 6/1971 | Inwood et al. | 193/35 |
| 3,710,099 | 1/1973 | Chapman . | |
| 3,721,326 | 3/1973 | Bussienne | 193/35 R |
| 3,735,143 | 5/1973 | Langford . | |
| 3,869,031 | 3/1975 | Coleman et al. | 193/35 R |
| 3,890,221 | 6/1975 | Muehlethaler . | |
| 3,900,112 | 8/1975 | Azzi et al. | 211/148 |
| 3,915,275 | 10/1975 | Specht | 193/35 R |
| 3,930,991 | 1/1976 | Gillespie . | |
| 3,944,076 | 3/1976 | Goulds et al. . | |
| 3,990,580 | 11/1976 | Self . | |
| 3,993,899 | 11/1976 | Chapman . | |
| 4,050,561 | 9/1977 | Seitz | 193/35 R |
| 4,054,195 | 10/1977 | Wahl | 193/35 R |
| 4,057,146 | 11/1977 | Castaneda et al. . | |
| 4,203,522 | 5/1980 | Fraenkel et al. . | |
| 4,204,950 | 5/1980 | Burford, Jr. . | |
| 4,225,242 | 9/1980 | Lane . | |
| 4,271,966 | 6/1981 | Crowley . | |
| 4,356,921 | 11/1982 | Fraenkel . | |
| 4,454,029 | 6/1984 | COdding . | |
| 4,513,868 | 4/1985 | Culling et al. . | |
| 4,626,677 | 12/1986 | Browne . | |
| 4,630,736 | 12/1986 | Maughan et al. . | |
| 4,647,211 | 3/1987 | Browne . | |
| 4,681,203 | 7/1987 | Kornylak | 193/35 R |
| 4,697,709 | 10/1987 | Codding . | |
| 4,699,273 | 10/1987 | Suggi-Liverani et al. . | |
| 4,718,558 | 1/1988 | Castaneda . | |
| 4,765,493 | 8/1988 | Kinney | 193/35 R |
| 4,786,895 | 11/1988 | Castaneda . | |
| 4,807,762 | 2/1989 | Illy et al. . | |
| 4,811,249 | 3/1989 | Marsh . | |
| 4,878,582 | 11/1989 | Codding . | |
| 5,062,532 | 11/1991 | Zivley . | |
| 5,148,923 | 9/1992 | Fraenkel et al. . | |
| 5,179,474 | 1/1993 | Bailey et al. . | |

*Primary Examiner*—D. Glenn Dayoan
*Attorney, Agent, or Firm*—Dressler, Goldsmith, Shore & Milnamow, Ltd.

[57] ABSTRACT

A roller track for a storage rack arranged for gravitational flow of load-bearing pellets. Freely rotatable rollers are journalled, each on a spindle, between two parallel walls. Rollers of a first group are journalled on spindles bolted to the walls. Rollers of a second group are journalled on spindles held by but not bolted to the walls. Each of the latter spindles has, at each end, a shoulder portion larger than an aperture in one of the walls and a pintle portion fitted into the aperture. The pintle portion has a cylindrical wall and the aperture has a cylindrical margin. Along at least a substantial portion of the roller track, every third roller is a roller of the first group while every other roller is a roller of the second group.

13 Claims, 1 Drawing Sheet

ROLLER TRACK FOR STORAGE RACK, ROLLER CONVEYOR, OR SIMILAR APPARATUS

Matter enclosed in heavy brackets [ ] appears in the original patent but forms no part of this reissue specification; matter printed in italics indicates the additions made by reissue.

TECHNICAL FIELD OF THE INVENTION

This invention pertains to improvements in a roller track for a storage rack, roller conveyor, or similar apparatus. The roller track has a novel arrangement of freely rotatable rollers journalled between two parallel walls.

BACKGROUND OF THE INVENTION

Typically, as used in a storage rack of a type arranged for gravitational flow of load-bearing pallets, a roller track comprises two walls, which may be respectively provided by separate structural members and which are disposed in parallel relation to each other, and a longitudinal array of freely rotatable rollers, which are journalled between the walls in such manner that the rollers extend upwardly from a space between the walls. Moreover, as used in such a storage rack, the roller track has a slight inclination (e.g. 3°) relative to a horizontal plane. Such storage racks are available commercially from Unarco Material Handling (a unit of UNR Industries, Inc.) of Chicago, Ill.

It is conventional for each roller to have a spindle, on which such roller is journalled, and for each spindle to be individually bolted to and between the walls by a bolt passing through apertures in the walls and through an axial bore in such spindle. Because each storage rack employs many roller tracks, and because each roller track employs many rollers, it is laborious to bolt the spindle of every roller.

Thus, there has been a need for a better way to assemble the rollers to the walls, in such a roller track.

SUMMARY OF THE INVENTION

This invention provides improvements in a roller track for a storage rack, roller conveyor, or similar apparatus, particularly but not exclusive a storage rack of the type arranged for gravitational flow of load-bearing pallets.

The roller track is similar to roller tracks known heretofore in comprising two walls, which are disposed in parallel relation to each other, and an array of freely rotatable rollers, which are journalled between the walls in such manner that the rollers extend upwardly from a space between the walls.

As in known roller tracks, each roller has a spindle, on which such roller is journalled. The axes of the spindles define a plane, which may have a slight inclination relative to a horizontal plane, as in a storage rack arranged for gravitational flow, or which may be substantially horizontal, as in a roller conveyor.

As improved by this invention, the roller track differs from roller tracks known heretofore in that the rollers are divided into two groups, namely a first group and a second group. In the first group, in which the rollers are similar to rollers used in roller tracks known heretofore, the rollers are journalled on spindles bolted to the walls so as to assemble the rollers to the walls. However, in the second group, it is a characteristic feature of this invention that the rollers are journalled on spindles held by but not bolted to the walls.

In a preferred construction, each wall has a separate aperture defining a continuous margin and being associated with a respective one of the rollers of the second group. Each end of the spindle of each roller of the second group is associated with one of the apertures of one of the walls and has a shoulder portion larger than the associated aperture and a pintle portion fitted into the associated aperture.

Preferably, each spindle of the rollers of the second group has rotational symmetry about an axis of such spindle, and each aperture has rotational symmetry about an axis of such aperture. It is preferred, moreover, that the pintle portion of each end of each such spindle has a cylindrical surface and that each aperture has a cylindrical margin.

In a preferred arrangement, along at least a substantial portion of the roller track, every nth roller is a roller of the first group while every other roller is a roller of the second group. In the preferred arrangement, n is a whole number greater than one, preferably three.

These and other objects, features, and advantages of this invention are evident from the following description of a preferred embodiment of this invention with reference to the accompanying drawings.

DETAILED DESCRIPTION OF PREFERRED EMBODIMENTS

Figure 1:
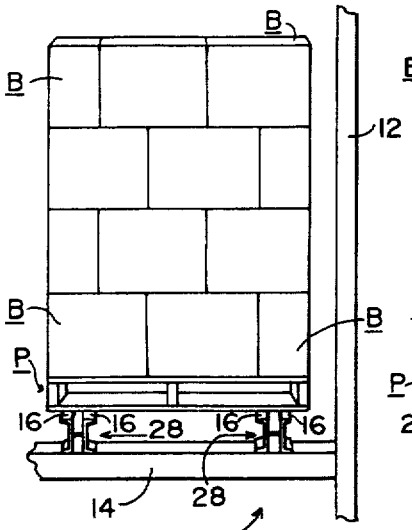
FIG. 1 is a front view of one lane on one level of a storage rack arranged for gravitational flow of load-bearing pallets. Two roller tracks, which embody this invention, are shown with such a pallet on the roller tracks.
Figure 2:
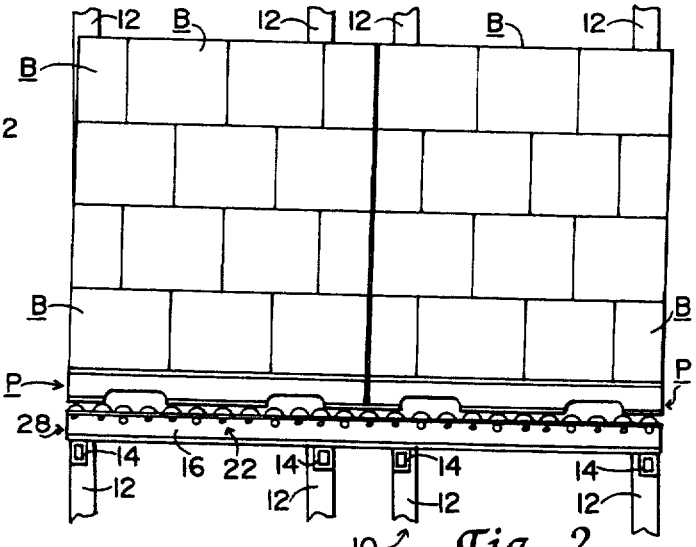
FIG. 2 is a side view of subject matter shown in FIG. 1. Two such pallets are shown in the lane.
Figure 6:
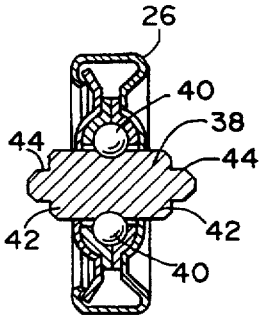
FIG. 6 is a somewhat enlarged, cross-sectional view taken through a different one of the rollers of the same group, along line 6—6 in FIG. 4, in a direction indicated by arrows.
Figure 3:
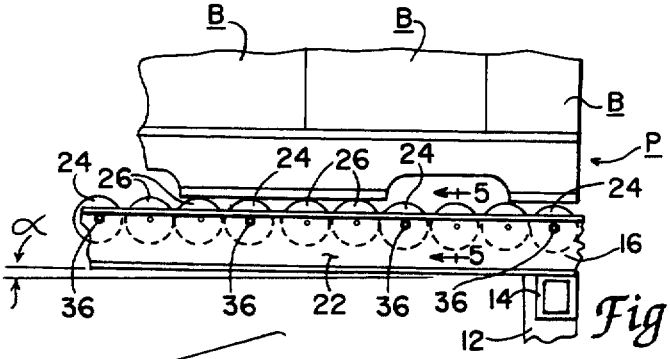
FIG. 3 is an enlarged, fragmentary detail, which is taken from FIG. 2.
Figure 4:
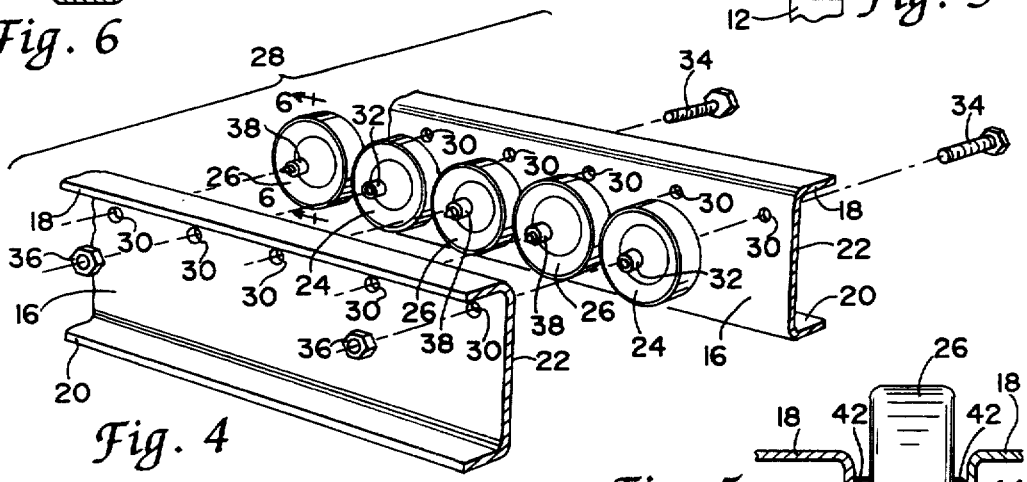
FIG. 4 is a further enlarged, fragmentary, exploded, perspective view of two walls and some of each of two groups of freely rotatable rollers, as assembled to provide one of the roller tracks.
Figure 5:
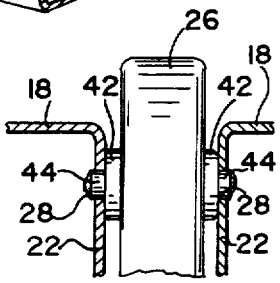
FIG. 5 is a greatly enlarged fragmentary, sectional view taken through one of the rollers of one such group, along line 5—5 in FIG. 3, in a direction indicated by arrows.

As shown in FIGS. 1, 2, and 3, a storage rack 10 constituting a preferred embodiment of this invention is arranged for gravitational flow of pallets P bearing loads of stacked boxes B. The storage rack 10 is similar to storage racks known heretofore in being a bolted or welded structure comprising structural steel members. A bolted structure is preferred. These members include upright members 12, transverse members 14, and longitudinal members 16. As indicated by an angle $\alpha$ in FIG. 3, each longitudinal member 16 has a slight inclination (e.g. 3°) relative to a horizontal plane.

Each longitudinal member 16 has an upper flange 18 extending in a lateral direction, a lower flange 20 extending in the same direction, and a vertical wall 22 extending between the flanges 18, 20. The longitudinal members 16 are arranged in pairs, in which the flanges 18, 20, of the respective members 16 extend oppositely, and in which the walls 16 of the respective members 22 are disposed in parallel relation to each other.

The longitudinal members 16 are arranged in pairs. The longitudinal members 16 of each pair are assembled with a longitudinal array of steel rollers including rollers 24 of a first group and rollers 26 of a second group to provide a roller track 28. In the roller track 28, the rollers 24, 26, are journalled between the walls 22 so as to be freely rotatable. Moreover, the rollers 24, 26, are journalled in such manner that the rollers 24, 26, extend upwardly from a space between the walls 22. Because of the slight inclination of each longitudinal member 16, the roller track 28 has a similar inclination (e.g. 3°) relative to a horizontal plane.

The roller tracks 28 are arranged in pairs. Each pair of the roller tracks 28 is used to support pallets, such as the pallets P, in one lane on one level of the storage rack 10. According to conventional practice, the storage rack 10 may have multiple lanes on multiple levels.

At its lower end, each roller track 28 comprises a stop (not shown) which is mounted between the longitudinal members 16. The stop limits gravitational flow of the pallets, such as the pallets P, along such roller track 28. A preferred stop is disclosed in a copending application filed simultaneously herewith under U.S. Ser. No. 07/582,327 and assigned commonly herewith. The copending application entitled "Roller Track And Stop Therefor."

Near the upper flange 18 of each longitudinal member 16, the wall 22 of such longitudinal member 16, has a longitudinal array of regularly spaced, circular apertures 30, which extend through the wall 22. In the longitudinal members 16 of each pair, the apertures 30 are arranged in pairs. Each pair of the apertures 30 is associated with one of the rollers 24 or with one of the rollers 26. Each pair of the apertures 30 includes one aperture 30 in each longitudinal member 16 and the apertures 30 of each pair are aligned with each other. Because the apertures 30 are circular, each aperture 30 has a continuous margin and has rotational symmetry about an axis of such aperture 30.

The rollers 24 of the first group are similar to rollers used in roller tracks used in roller tracks known heretofore and are journalled similarly. Each roller 24 has a spindle 32 and ball bearing (not shown) enabling such roller 24 to rotate freely on the spindle 32. The spindle 32 is tubular and is aligned with the apertures 30 associated with such roller 24.

A bolt 34 passing through one of the apertures 30 associated with each roller 24, through the spindle 32 of such roller 24, and through the other associated aperture 30, and a nut 36 threaded onto the bolt 34 are used to bolt such roller 24 to the walls 22 having the associated apertures 30. Such roller 24 is bolted in such manner that the spindle 32 bears against the continuous margins of the associated apertures 30.

The roller 26 of the second group are different from the rollers 24 of the first group and are journalled differently. Each roller 26 has a spindle 38 and ball bearings 40 enabling such roller 26 to rotate freely on the spindle 38. Such bearings 40 are mounted operatively in a known manner.

The spindle 38 of each roller 26 has rotational symmetry about an axis of the spindle 38 and is provided at each end with a shoulder portion 42 and a pintle portion 44. The shoulder portion 42 is larger than the apertures 30 and bears against the continuous margin of one of the apertures 30 associated with such roller 26. The pintle portion 44 has a cylindrical surface conforming to the same apertures 30 and is fitted into the same aperture 30. Although it is preferred for the pintle portion 44 to be press-fitted into such aperture 28, the pintle portion 44 may be freely rotatable within such aperture 30.

Along at least a substantial portion of each roller track 28, and preferably along its entire length except possibly at either end or at both ends, every nth roller is a roller 24 of the first group while every other roller is a roller 26 of the second group. Preferably, as shown, n is three.

As shown, the rollers 24 of the first group and the rollers 26 of the second group are arranged in a repeating pattern, along the aforenoted substantial portion of each roller track 28. In the repeating pattern, every third roller is a roller 24 of the first group, and every other roller is a roller 26 of the second group.

In each roller track 28, it is sufficient to bolt every third roller to the walls 22 of the longitudinal member 16. Since there is no need to bolt every roller, the assembly of the storage rack 10 is simplified.

Various modifications may be made without departing from the scope and spirit of this invention.

I claim:

1. For a storage rack or roller conveyor, a roller track comprising two walls disposed in parallel relation to each other so as to define a space between the walls and a longitudinal array of freely rotatable rollers journalled between the walls in such manner that the rollers extend upwardly from the space between the walls, each roller having a spindle and being journalled on the spindle, the rollers being divided into a first group wherein the rollers are journalled on spindles bolted to and between the walls and a second group wherein the rollers are journalled on spindles held by but not bolted to the walls, wherein the rollers are arranged along a substantial portion of the roller track in a repeating pattern, in which every nth roller is a roller of the first group while every other roller is a roller of the second group, n being a whole number greater than one.

2. The roller track of claim 1 wherein each wall has a separate aperture associated with a respective one of the rollers of the second group, and wherein the spindle of each roller of the second group has two ends, each end being associated with one of the apertures in one of the walls and having a shoulder portion larger than the associated aperture and a pintle portion fitted into the associated aperture.

3. The roller track of claim 2 wherein each spindle of the rollers of the second group has an axis and has rotational symmetry about the axis of such spindle and each aperture has an axis and has rotational symmetry about the axis of such aperture.

4. The roller track of claim 3 wherein each aperture has a cylindrical margin and the pintle portion of each end of each spindle of the rollers of the second group has a cylindrical surface conforming to each aperture.

5. For a storage rack or roller conveyor, a roller track comprising two walls disposed in parallel relation to each other so as to define a space between the walls and a longitudinal array of freely rotatable rollers journalled between the walls in such manner that the rollers extend upwardly from the space between the walls, each roller having a spindle and being journalled on the spindle, each spindle having an axis and the axes defining a plane, the plane having a slight inclination relative to a horizontal plane, the rollers being divided into a first group wherein the rollers are journalled on spindles bolted to and between the walls and a second group wherein the rollers are journalled on spindles held by but not bolted to the walls, wherein each wall has a separate aperture associated with a respective one of the rollers of the second group, and wherein the spindle of each roller of the second group has two ends, each end being associated with one of the apertures in one of the walls and having a shoulder portion larger than the associated aperture and a pintle portion fitted into the associated aperture, wherein the rollers are arranged along at least a substantial portion of the roller track in a repeating pattern, in which every nth roller is a roller of the first group while every other roller is a roller of the second group, n being a whole number greater than one.

6. For a storage rack or roller conveyor, a roller track comprising two walls disposed in parallel relation to each other so as to define a space between the walls and a longitudinal array of freely rotatable rollers journalled between the walls in such manner that the rollers extend upwardly from the space between the walls, each roller having a spindle and being journalled on the spindle, the rollers being divided into a first group wherein the rollers are journalled on spindles bolted to and between the walls and a second group wherein the rollers are journalled on spindles held by but not bolted to the walls, wherein, along at least a substantial portion of the roller track, every third roller is a roller of the first group while every other roller is a roller of the second group.

7. For a storage rack or roller conveyor, a roller track comprising two walls disposed in parallel relation to each other so as to define a space between the walls and a longitudinal array of freely rotatable rollers journalled between the walls in such manner that the rollers extend upwardly from the space between the walls, each roller having a spindle and being journalled on the spindle, each spindle having an axis and the axes defining a plane, the plane having a slight inclination relative to a horizontal plane, the rollers being divided into a first group wherein the rollers are journalled on spindles bolted to and between the walls and a second group wherein the rollers are journalled on spindles held by but not bolted to the walls, wherein each wall has a separate aperture associated with a respective one of the rollers of the second group, and wherein the spindle of each roller of the second group has two ends, each end being associated with one of the apertures in one of the walls and having a shoulder portion larger than the associated aperture and a pintle portion fitted into the associated aperture, wherein along at least a substantial portion of the roller track, every third roller is a roller of the first group while every other roller is a roller of the second group.

8. For a storage rack or [wall] *roller* conveyor, a roller track comprising two walls disposed in parallel relation to each other so as to define a space between the walls and a longitudinal array of freely rotatable rollers journalled between the walls in such manner that the rollers extend upwardly from the space between the walls, each roller having a spindle and being journalled on the spindle, the rollers being divided into a first group wherein the rollers are journalled on spindles bolted to and between the walls and a second group wherein the rollers are journalled on spindles held by but not bolted to the walls, the rollers being arranged along at least a substantial portion of the roller track in a repeating pattern, which is comprised of rollers of the first group and rollers of the second group.

9. The roller track of claim 8 wherein, in the repeating pattern, every nth roller is a roller of the first group, n being a whole number and being at least three.

*10. The roller track of claim 1 wherein each roller is longitudinally aligned with each other roller along said roller track.*

*11. The roller track of claim 8 wherein each roller is longitudinally aligned with each other roller along said roller track.*

*12. The roller track of claim 1 wherein the centerline of each roller is disposed in a common plane spaced equidistantly between said walls.*

*13. The roller track of claim 8 wherein the centerline of each roller is disposed in a common plane spaced equidistantly between said walls.*

* * * * *